United States Patent [19]

Maxwell

[11] Patent Number: 4,583,904
[45] Date of Patent: Apr. 22, 1986

[54] FIREWOOD HANDLER

[76] Inventor: Foy J. Maxwell, Box 863, Hendersonville, N.C. 28793

[21] Appl. No.: 615,540

[22] Filed: May 31, 1984

[51] Int. Cl.4 ............................................. B65G 7/12
[52] U.S. Cl. ..................................... 414/453; 254/131
[58] Field of Search ............... 414/450, 451, 452, 453, 414/454, 455, 456, 457, 24.5, 911; 254/94, 131

[56] References Cited

U.S. PATENT DOCUMENTS

| 31,741 | 3/1861 | Humes | 414/453 |
| 70,303 | 10/1867 | Whipple | 414/453 |
| 116,325 | 6/1871 | Kiff | 414/453 |
| 611,890 | 10/1898 | Brown et al. | 414/454 |
| 851,164 | 4/1907 | Davenport | 414/455 |
| 1,155,235 | 9/1915 | Harvey et al. | 414/454 |
| 3,477,598 | 11/1969 | Hassell et al. | 414/452 |
| 4,368,874 | 1/1983 | Weisgerber | 254/131 |
| 4,375,935 | 3/1983 | Miller | 414/454 |

FOREIGN PATENT DOCUMENTS 548979 7/1956 Belgium ............................. 414/453

Primary Examiner—Robert J. Spar
Assistant Examiner—Stuart J. Millman
Attorney, Agent, or Firm—Jacob Shuster

[57] ABSTRACT

A lift bar spaced forwardly of the front end of an elongated tubular frame member supported above ground by a pair of wheels, is positioned in abutment with a log at ground level by forward tilting of the frame member to a pick-up position. In the pick-up position, a pivoted hook on the frame member drops into engagement with the log to hold it on the lift bar above ground during wheeled transport. The log is unloaded by retracting the hook and rolling it off the lift bar over retainer jaws fixed to the lift bar on opposite sides of a pivot plane in which the hook is displaceable and through which the frame axis extends perpendicular to the lift bar.

4 Claims, 8 Drawing Figures

U.S. Patent   Apr. 22, 1986   Sheet 1 of 2   4,583,904
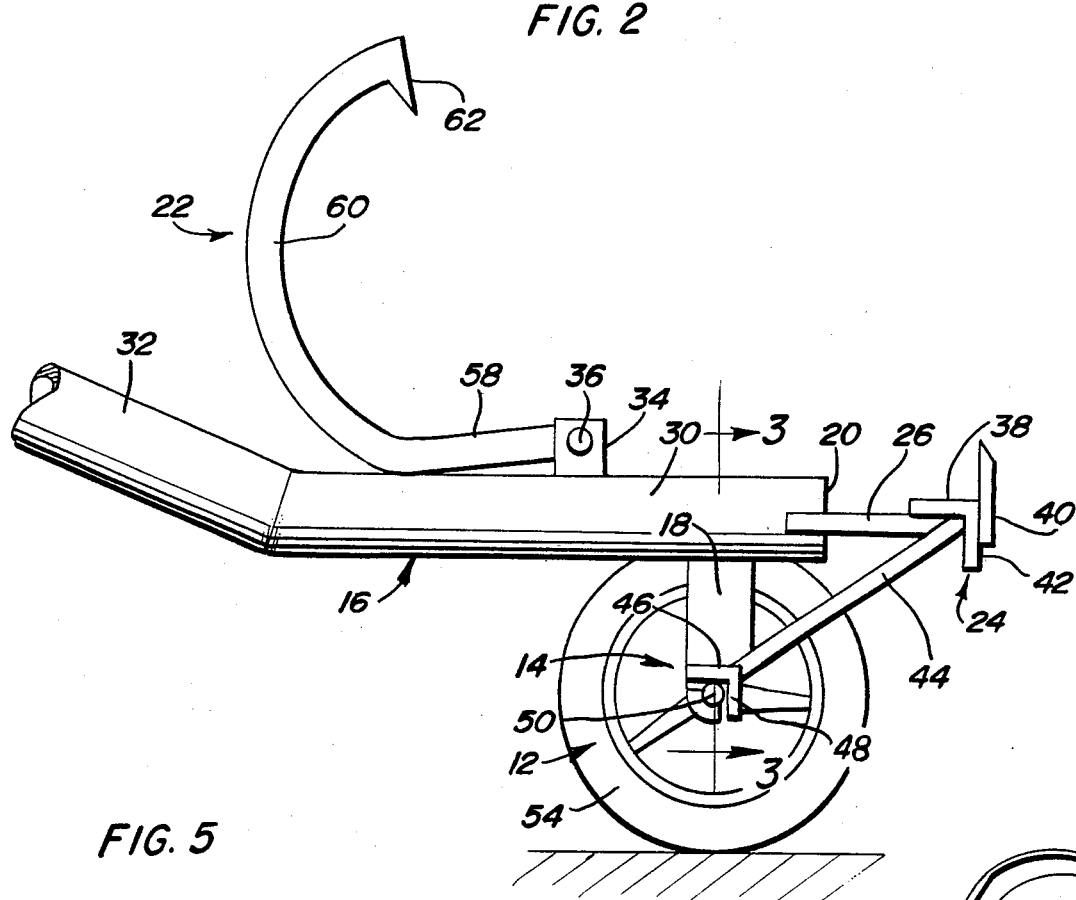
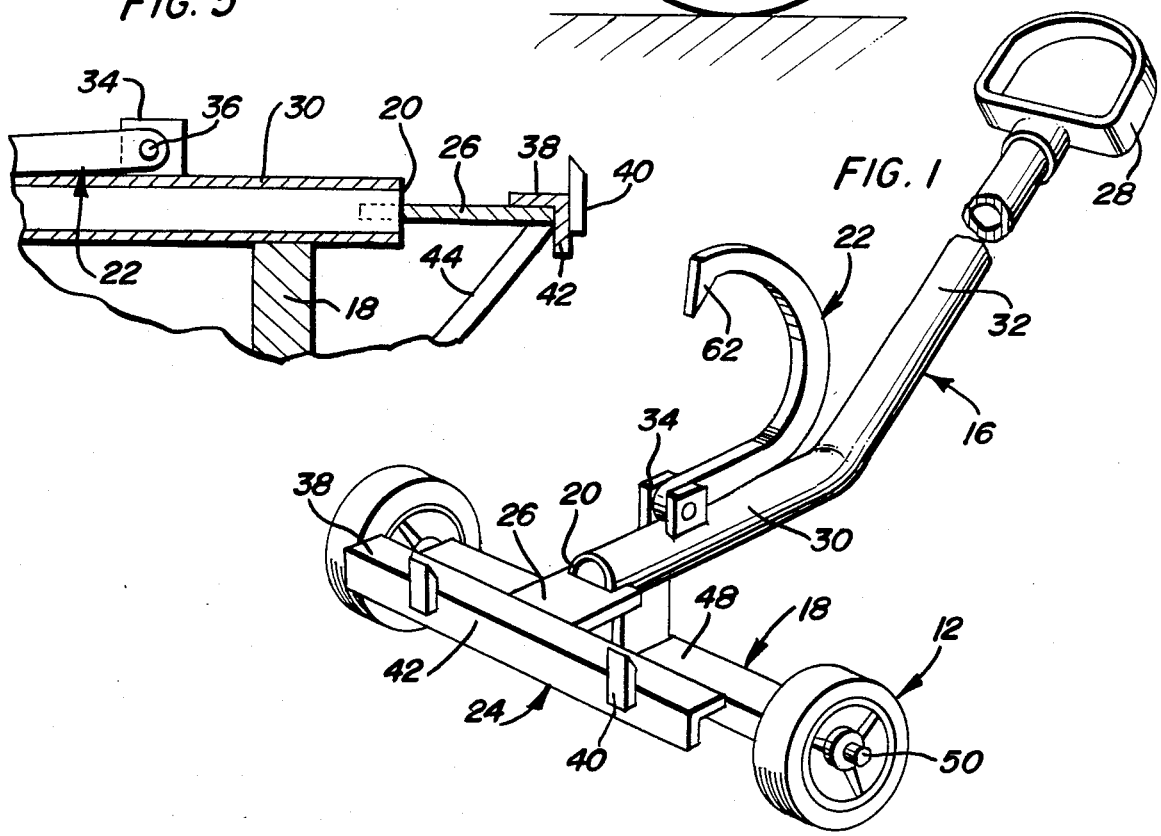

FIREWOOD HANDLER

BACKGROUND OF THE INVENTION

This invention relates to wheeled load handling devices and more particularly to the handling of firewood log sections as the loads.

Wheeled hand trucks for pick-up, transport and delivery of various types of loads are already well known. Such load handlers generally include a frame having a front load pick-up end, a pair of wheels supporting the frame adjacent to the front end and grip handles at the rear end for manually pushing or pulling and angularly tilting the frame about the wheel axles. Some of such load handlers also mount pivoted hooks to engage the rim portions of certain types of loads, such as barrels, to hold the loads on the frame. However, the design and arrangement of parts associated with such known load handlers are unsuitable for the handling of firewood logs.

Firewood logs have heretofore required manual handling despite the availability of aforementioned wheeled load handling devices, because the logs must be picked off the ground and deposited onto some elevated surface such as a log splitter. The variation in size of such logs, the lack of any grippable rim and the rough cylindrical shape of the logs makes handling difficult and inefficient with any available load handler in a relatively small scale operation. It is therefore an important object of the present invention to provide a load handler specifically designed to efficiently assist in the handling of firewood logs.

A further object of the present invention is to provide a special load handler for firewood logs that is economically feasible to manufacture and cost effective for marketing to small scale operation consumers as well as large scale users.

SUMMARY OF THE INVENTION

In accordance with the present invention, an elongated tubular member constitutes a frame having a forward portion terminating at a front end from which a spacer plate extends along the longitudinal axis of the frame to a transversely extending lift bar. The rearward portion of the frame extends at an obtuse angle to the forward portion to a handle. The forward portion of the frame is supported above ground by a pair of wheels carried at the opposite ends of a transverse axle support bar spaced below the frame adjacent the front end by a connecting web aligned with a plane through which the longitudinal axis of the forward frame portion extends, centrally intersecting the lift and axle support bars. Braces interconnected between the bars maintain them in parallel spaced relation and form a more rigid assembly with the connecting web. A load gripping hook is pivoted on top of the forward frame portion for displacement along the aforementioned plane with which the connecting web is aligned.

By means of the handle, the frame may be tilted about the wheel axles to a pick-up position in which the lift bar contacts the ground forwardly of the wheels and in abutment with a log lying on the ground with its longitudinal axis substantially parallel to the lift bar. A pair of retainer jaws or jags secured to the lift bar between the braces and the frame axis engage the log so that it may be gripped against the lift bar by a gripping jaw at the end of the hook pivotally displaced into engagement with the log. The frame may then be pivotally displaced from the pick-up position to elevate the log and transport it to a delivery site such as a log splitter. The log may be unloaded onto a surface above ground by retraction of the hook and rolling of the log off the frame and lift bar over the retainer jaws. The retracted hook gravitationally rests on top of the forward frameportion and drops to the gripping position only when the frame is forwardly tilted to the pick-up position. Logs varying in size from a nominal 2½ foot diameter and 6 foot length may be handled with much ease and efficiency.

BRIEF DESCRIPTION OF DRAWING FIGURES

Other objects, uses and advantages of the invention will become apparent from the following detailed description and consideration of the appended drawings referred therein, wherein:

FIG. 1 is a perspective view of a load handling device constructed in accordance with one embodiment of the invention;

FIG. 2 is an enlarged partial side elevation view of the load handling device shown in FIG. 1;

FIG. 5 is a partial section view taken through a plane indicated by section line 5—5 in FIG. 4.

DETAILED DESCRIPTION OF PREFERRED EMBODIMENT

Figure 4:
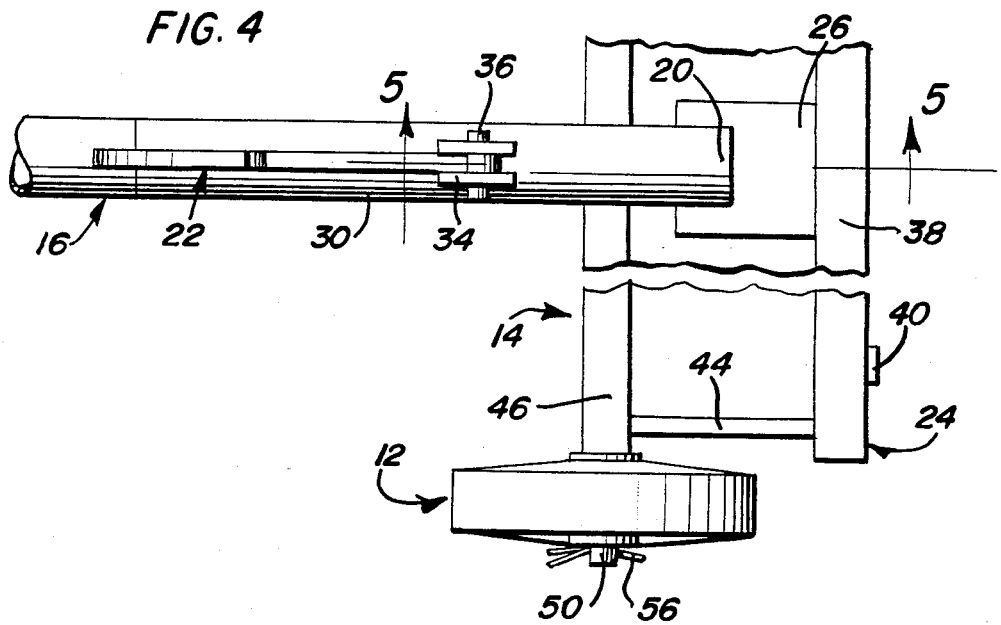
FIG. 4 is a partial top plan view of the load handling device shown in FIGS. 1 and 2.

Referring now to the drawings in detail, FIG. 1 illustrates the firewood handling device of the present invention, generally referred to by reference numeral 10. The handling device 10 is supported on the ground by a pair of spaced wheel assemblies 12 that are mounted at opposite ends of an axle support element 14 connected in transverse relation to an elongated frame 16 by a connecting web plate 18 depending from the frame in spaced adjacency to its front end 20. A load gripping hook 22 is pivoted to the top of the frame spaced rearwardly of the front end 20. A load lift element 24 is secured to and spaced forwardly of the frame in parallel relation to axle support element 14 by a spacing plate 26. A handle 28 is connected to the frame 16 at its end opposite the front end 20.

The frame 16 is in the form of an elongated tubular member having a forward portion 30 that extends rearwardly from the front end 20 and a rearward portion 32 that extends at an obtuse angle from the forward portion to the handle 28. The connecting web 18 depends from the forward portion 30 as more clearly seen in FIGS. 2 and 5 while pivot brackets 34 are secured to the top of forward portion 30 in rearward spaced relation to the connecting web 18 to mount a pivot pin 36 at which one end of the hook 22 is pivotally connected to the frame.

The spacing plate 26 straddles the front end 20 of the tubular frame and projects forwardly therefrom in a plane through which the longitudinal axis of forward portion 30 extends. The spacing plate is secured as by welding to the frame and to the load lift element 24 which is in the form of a right angle cross-section bar having a load contacting leg portion 38 overlying the spacing plate 26 and parallel thereto as shown in FIGS.

2 and 5. A pair of load retaining jaws or jags 40 are welded to a ground contact leg portion 42 of the lift bar 24, in laterally spaced relation to each other on opposite sides of the axis of forward frame portion 30. The jaws 40 project slightly above the leg portion 38 as shown.

Figure 3:
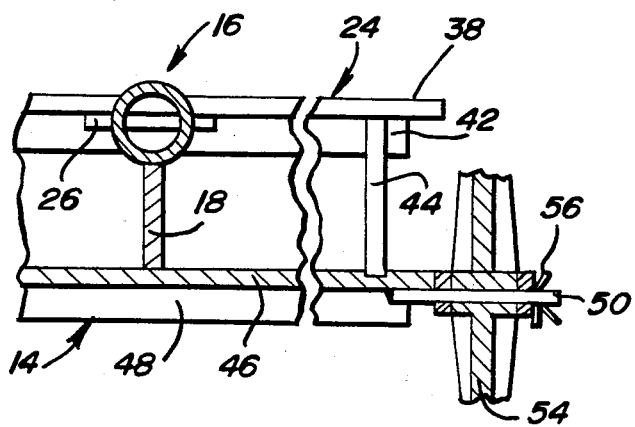
FIG. 3 is a partial section view taken through a plane indicated by section line 3—3 in FIG. 2.

The lift bar 24 is maintained in parallel spaced relation to the axle support element 14 by the interconnections between the frame, the depending web 18, the spacing plate 26 and a pair of braces 44 welded to the lift bar 24 and axle support element 14 adjacent the ends at which the wheel assemblies 12 are located as more clearly seen in FIGS. 3 and 4. The axle support element is in the form of a right angle cross-section bar having a leg portion 46 parallel to the axis of forward frame portion 30, and a leg portion 48. The web 18 is welded to the leg portion 46 centrally between the lateral ends of the support bar 14 from which axles or spindle rods 50 project. The axle rods are welded to the support bar 14 and rotatably support the hub portion 52 of the wheel members 54 of each wheel assembly 12. The wheel hubs are held assembled by cotter pins 56 on the axle rods between washers as shown in FIG. 3. The braces 44 are located in spaced adjacency to the wheel assemblies, while the load retaining jaws 40 are located on the lift bar 24 laterally between the braces 44 and the centrally attached spacing plate 26.

Referring now to FIG. 2, the hook 22 includes a straight section 58 pivotally connected to the top of the frame by pivot pin 36, and a curved section 60 extending substantially tangentially from section 58 to a load gripping jaw 62. In the retracted position of the hook as shown in FIG. 2, it rests on top of the forward frame portion 30. The hook is pivotally displaceable from such retracted position in a pivotal plane established by pivot pin 36 in alignment with the axis of frame portion 30 and the web 18 and intersecting the lift bar 24 between the load retaining jaws 40. The radial distance of hook jaw 62 from the pivot pin 36 is greater than the distance between the pin 36 and the jaws 40 in the pivot plane. Accordingly, the jaw 62 will effectively grip the load when the hook is displaced from its retracted position to a load gripping position.

Figure 7:
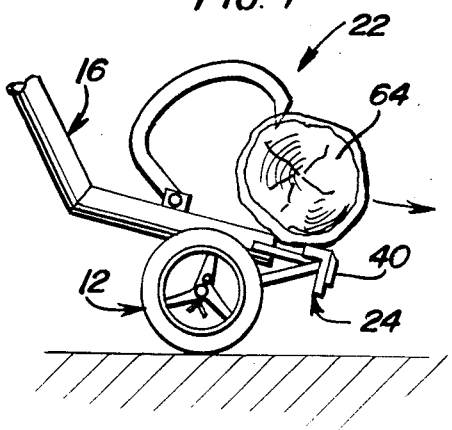
FIGS. 6, 7 and 8 are partial side elevation views of the load handling device in various load handling positions.
Figure 6:
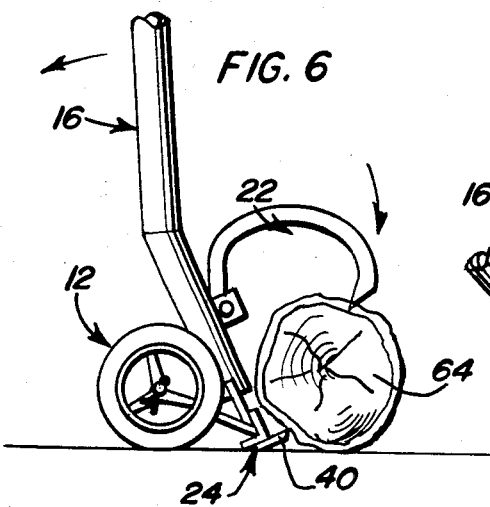
Figure 8:
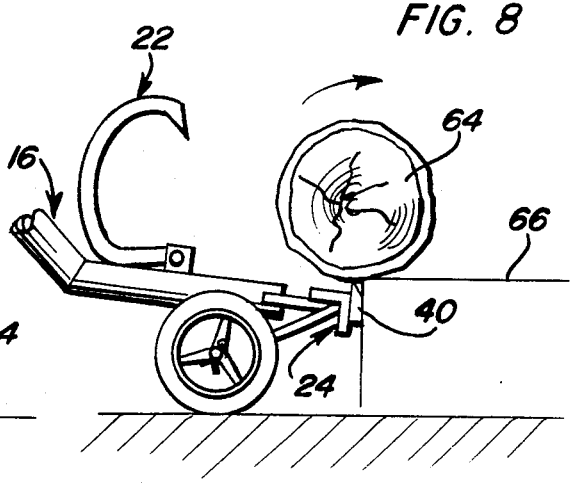

As shown in FIG. 6, the frame 16 is wheeled over to a typical load in the form of a firewood log 64 of generally cylindrical shape lying on the ground oriented generally parallel to the lift bar 24. The frame 16 is tilted to a pick-up position, by displacement about the wheel axles, so that the leg portion 42 of lift bar 24 contacts the ground while leg portion 38 abuts the log 64. In this pick-up position the jaws 40 on the lift bar engage the log while the hook 22 is gravitationally pivoted to its load gripping position with jaw 62 engaging the log. When the frame 16 is then displaced by means of handle 28 in a counter-clockwise direction as viewed in FIG. 6 to a transport position as shown in FIG. 7, the log is retained on the lift bar and frame by the gripping action of the jaws 40 and 62 as it is raised off the ground. The log loaded frame may then be wheeled to a desired unloading site, such as a splitter support surface 66 as shown in FIG. 8. By pivotal displacement of the frame 16 about the rotational axis of the wheels 12, the log 64 may be raised or lowered to an unloading position with the forward frame portion 30 downwardly inclined toward the front end and the lift bar 24 at a height just below the surface 46 as shown. The frame may then be tilted slightly forward or clockwise as viewed in FIG. 8 to release the hook which is then retracted from the log so that the log may be rolled onto the surface 66 over the jaws 40 as shown by arrow 68 in FIG. 8. In the unloading position, the hook will be gravitationally retained in the retracted position. The foregoing handling operation is facilitated in part by the location of hook pivot 36 above the rotational axis of the wheels 12 in all positions of the frame respectively shown in FIGS. 6, 7 and 8.

The foregoing description and the drawings merely explain and illustrate the invention by way of example, and except for the limitations set forth in the appended claims all modifications and variations of the disclosure apparent to persons skilled in the art are intended to be within the scope of the invention.

What is claimed is:

1. A firewood handler, comprising an elongated frame having forward and rearward portions extending in obtuse angular relation to each other, and a handle connected to the rearward portion of the frame, the improvement comprising a connecting web depending from the forward portion of the frame, a support element connected to the web in spaced relation to the frame and extending transversely thereof, wheel means mounted on the support element for ground support of the forward portion of the frame, a load lift element, spacing means connected to the forward portion of the frame and extending forwardly therefrom for support of the load lift element in parallel spaced relation to the support element, at least two braces interconnected between the support and load lift elements adjacent to said wheel means, at least two log engaging jaws fixed to the load lift element, a hook having a curved section and a straight section substantially tangential to the curved section, a log gripping jaw fixed to the curved section of the hook, and means pivotally mounting the straight section of the hook on the forward portion of the frame for displacement of the hook in substantially coplanar relation to the web between a retracted position resting above the forward portion of the frame and a load gripping position.

2. The firewood handler as defined in claim 1 wherein said frame consists of a single tubular member and said support and load lift elements are right angle bars having leg portions to which the web and the spacing means are secured, respectively, said leg portions being substantially parallel to the forward portion of the frame.

3. The firewood handler as defined in claim 2 wherein said spacing means comprises a plate member straddling the forward portion of the frame and projecting forwardly therefrom in underlying relation to the leg portion of the load lift element.

4. The firewood handler as defined in claim 3 wherein said wheel means includes a pair of wheel members, and axle rods secured to opposite lateral ends of the support element on which the wheel members are rotatably mounted in rearwardly spaced relation to the load lift element.

* * * * *